United States Patent
Ito et al.

(10) Patent No.: US 12,039,212 B2
(45) Date of Patent: Jul. 16, 2024

(54) NON-TRANSITORY MEDIUM STORING PROGRAM EXECUTABLE BY COMPUTER OF INFORMATION PROCESSING APPARATUS FOR CONTROLLING SPECIFIC LABEL DATA HAVING TEXT OBJECTS

(71) Applicant: BROTHER KOGYO KABUSHIKI KAISHA, Nagoya (JP)

(72) Inventors: Fuyuko Ito, Nagoya (JP); Jun Komura, Nagoya (JP); Kazuhiko Kondo, Nagoya (JP); Ryoji Ban, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/475,878

(22) Filed: Sep. 27, 2023

(65) Prior Publication Data
US 2024/0111466 A1  Apr. 4, 2024

(30) Foreign Application Priority Data

Sep. 29, 2022 (JP) .................................. 2022-155966

(51) Int. Cl.
 *G06F 3/12* (2006.01)
(52) U.S. Cl.
 CPC .......... *G06F 3/1243* (2013.01); *G06F 3/1204* (2013.01); *G06F 3/1208* (2013.01)
(58) Field of Classification Search
 CPC ..... G06F 3/1243; G06F 3/1204; G06F 3/1208
 USPC .......................................................... 358/1.13
 See application file for complete search history.

(56) References Cited

U.S. PATENT DOCUMENTS

| | | | |
|---|---|---|---|
| 2009/0106649 A1* | 4/2009 | Nose ..................... | G06F 40/103 715/243 |
| 2014/0307273 A1 | 10/2014 | Kajihara et al. | |
| 2017/0253027 A1* | 9/2017 | Kanda .................. | B41J 2/04586 |
| 2019/0073350 A1* | 3/2019 | Shiotani ................ | G06F 40/186 |
| 2021/0303218 A1* | 9/2021 | Nakamura ............ | G06F 3/1285 |

FOREIGN PATENT DOCUMENTS

| | | |
|---|---|---|
| JP | 2006-268388 A | 10/2006 |
| JP | 2014-206859 A | 10/2014 |

* cited by examiner

*Primary Examiner* — Allen H Nguyen
(74) *Attorney, Agent, or Firm* — KENEALY VAIDYA LLP (57) ABSTRACT

A program stored in a non-transitory medium and being executable by a computer of an information processing apparatus causes the computer to: execute a reading process for reading a plurality of pieces of text data arranged in one column or in one row; and be ready to accept a first operation by a user. In a case of accepting the first operation, the program causes the computer to execute: an obtaining process for obtaining a number of pieces of text objects to be included in specific label data; a generating process for extracting text data by the number of pieces obtained in the obtaining process, and for generating specific records each consisting of the number of pieces of text data; and an auto associating process for associating each text data included in each of the records with one of the text objects included in the specific label data.

10 Claims, 9 Drawing Sheets

NON-TRANSITORY MEDIUM STORING PROGRAM EXECUTABLE BY COMPUTER OF INFORMATION PROCESSING APPARATUS FOR CONTROLLING SPECIFIC LABEL DATA HAVING TEXT OBJECTS

REFERENCE TO RELATED APPLICATIONS

This application claims priority from Japanese Patent Application No. 2022-155966 filed on Sep. 29, 2022. The entire content of the priority application is incorporated herein by reference.

BACKGROUND ART

Conventionally, a function called "database printing" is known as a technique for a program to edit data to be printed by a label printer. In the database printing, a database file is specified and one text object is associated with each field defined in the database file. Then, when a print instruction is received, label data is generated for each record registered in the database file, with the text data for each field written to each text object associated with the field, and printing based on the generated label data is executed by the label printer.

DESCRIPTION

For some labels, the number of text data to be arranged may be predetermined. When creating labels with the predetermined number of text data by the database printing, records each consisting of the predetermined number of text data are needed. Depending on the database file, all text data may be written in one column or in one row (line), and the records may not be clearly delimited. In such cases, there is a problem that the user cannot obtain desired labels.

According to an aspect of the present teaching, there is provided a non-transitory medium storing a program executable by a computer of an information processing apparatus, the program, when executed by the computer, causing the computer to: execute a reading process for reading a plurality of pieces of text data arranged in one column or in one row; and be ready to accept a first operation by a user in a state that the plurality of pieces of text data has been read, wherein in a case that the computer accepts the first operation, the program causes the computer to execute: an obtaining process for obtaining a number of pieces of text objects to be included in specific label data; a generating process for extracting text data, from the plurality of pieces of text data read in the reading process, by the number of pieces obtained in the obtaining process, and for generating specific records each consisting of the number of pieces of text data; and an auto associating process for associating each of the number of pieces of text data included in each of the specific records with one of the text objects included in the specific label data, and wherein the program further causes the computer to execute a specific printing process for executing printing by controlling a label printer, for each of the specific records generated in the generating process, based on the specific label data having the text objects in which the number of pieces of text data associated therewith are written respectively.

According to the program disclosed herein, the information processing apparatus generates, based on the first operation, the specific records from a plurality of text data arranged in one column or in one row, grouped by the number of text objects of the specific label data, and further associates each text data of the specific records with each text object of the specific label data. Furthermore, the program causes the label printer to print based on the specific label data in which each text data of the specific record is written. This results in an output of labels with the text data separated into the number of records desired by the user, even when multiple text data with no record separations are read.

An information processing apparatus that executes the above program, a control method for realizing the functions of the program, and a computer-readable storage medium that stores the program are also new and useful.

According to the technology disclosed herein, a program that can support database printing and improve the convenience of database printing is realized.

The following is a detailed description of the embodiment of the program with reference to the accompanying drawings. This specification discloses a program to be executed on a mobile terminal that can be connected to a label printer.

Figure 1:
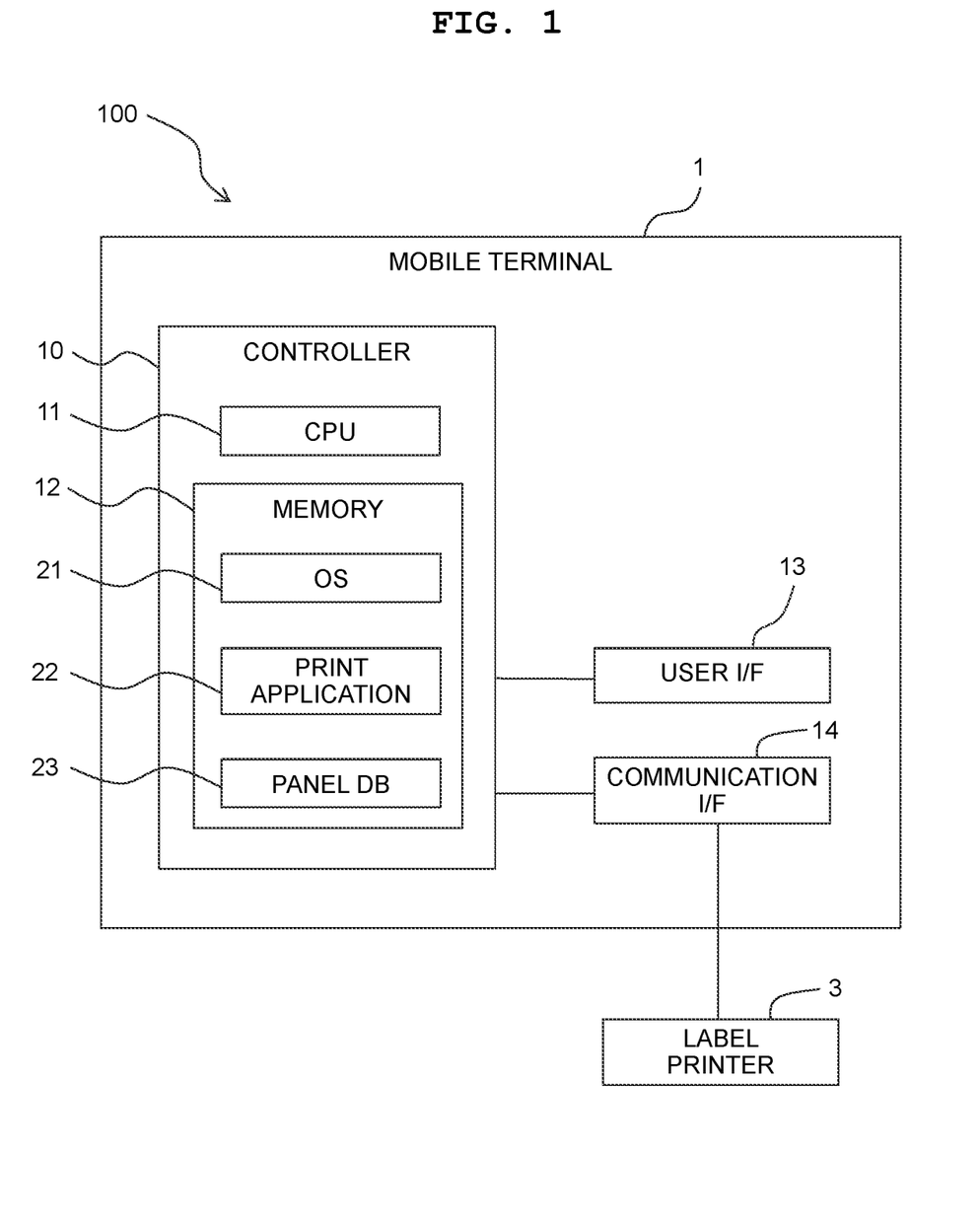
FIG. 1 is a schematic diagram of a printing system.

The mobile terminal 1 included in the printing system 100 of this embodiment has a controller 10 including a CPU 11 and a memory 12, as depicted in FIG. 1. The mobile terminal 1 is an example of an information processing apparatus. The CPU 11 is an example of a computer. The mobile terminal 1 also has a user interface (hereinafter referred to as "user IF") 13 and a communication interface (hereinafter referred to as "communication IF") 14, which are electrically connected to the controller 10. Note that the controller 10 in FIG. 1 is a collective term for the hardware and software used to control the mobile terminal 1, and does not necessarily represent a single piece of hardware actually present in the mobile terminal 1. The information processing apparatus is not limited to the mobile terminal, but may also be a personal computer.

The CPU 11 executes various processes according to programs read from the memory 12 or based on user operations. The memory 12 stores various programs and various data. The memory 12 is also used as a work area when various processes are executed, and a buffer provided in the CPU 11 is an example of the memory 12. An example of the memory 12 is not limited to the ROM, RAM, HDD, etc. built in the mobile terminal 1, but can also be a storage medium that is readable and writable by the CPU 11, such as CD-ROM, DVD-ROM, etc.

The user IF 13 includes hardware that displays a screen to inform information to the user and hardware that accepts operations by the user. The user IF 13 of the mobile terminal 1 includes a touch panel with a display function and an input receiving function. The user IF 13 may be a combination of a display capable of displaying information and hardware keys with input reception functions.

The communication IF 14 includes hardware for communicating with an external apparatus such as a label printer 3. Communication standards for the communication IF 14 include Ethernet (registered trademark), Wi-Fi (registered trademark), USB, etc. The mobile terminal 1 may be equipped with multiple communication IFs 14 that support multiple communication standards.

The memory 12 of the mobile terminal 1 stores an operating system (hereinafter referred to as "OS") 21, a printing application program (hereinafter referred to as "print application") 22, and a database for patch panels (hereinafter referred to as "panel DB") 23. The OS 21 is, for example, iOS (registered trademark), Android (registered trademark), Windows (registered trademark), macOS (registered trademark), and Linux (registered trademark).

The print application 22 is a program that, for example, accepts user instructions via the user IF 13 and, based on the received instructions, edits images to be printed and sends print instructions to the label printer 3. The print application 22 is an example of a program. The panel DB 23 is a database in which a plurality of panel data is stored. The panel DB 23 is a file created by the user and is not stored in the memory 12 when the mobile terminal 1 is shipped from a factory. The panel DB 23 is an example of a database file. Details of the print application 22 and the panel DB 23 are described below.

The label printer 3 in this embodiment has at least a printing function and a communication function. The printing method of the label printer 3 is, for example, thermal transfer, inkjet, or electrophotographic. When the label printer 3 receives printing instructions and label data to be printed from an external apparatus such as the mobile terminal 1 via the communication function, the label printer 3 executes printing based on the label data to create a label.

The label printer 3, for example, can accommodate a rolled label paper and has the capability to print images on the label paper to create labels. The rolled label paper is a print medium in which label paper is superimposed on a continuous strip of release paper and rolled up. The label paper may be a continuous long tape or a die cut label that has been pre-cut into a predetermined shape. The label printer 3 of this embodiment may also have a function to cut and discharge the pre-printed portion after printing.

The procedure for creating panel labels is then described with reference to the sequence diagram in FIG. 2. The procedures and processing steps of each program described below basically represent processing of the CPU 11 according to the instructions described in each program. In other words, "determine", "decide", "obtain", "accept" and other processes in the following description represent processing by the CPU 11. The processing by the CPU 11 also includes hardware control using an API of the OS 21. In this specification, the description of the OS 21 is omitted to describe the operation of each program. In addition, "obtain" is used in a concept that does not require a request.

The print application 22 of this embodiment is capable of performing database printing based on a database file containing text data. In the database printing, the print application 22 accepts designation of a database to be printed, text objects to be arranged in the label data, and an instruction to associate the designated database with the text objects.

When the print application 22 receives an instruction to execute the database printing, the print application 22 creates the label data in which text data contained in the designated database is written into each of the arranged text objects, and causes the label printer 3 to execute printing based on the created label data. The printing application 22 creates label data in which each text data contained in the database is written in one of the text objects for each text data contained in the database in turn and passes the label data to the label printer 3, thereby causing multiple labels printed with each text data in the database to be created.

The print application 22 of this embodiment is further capable of generating label data in which a plurality of text objects are arranged by using the database printing. For example, when the print application 22 accepts a designation of a database file that can register records with multiple fields each containing text data, the print application 22 can associate one text object for each field defined in the database file. In this case, the print application 22 generates label data for each record in the database file by writing the text data corresponding to each field to each text object associated with that field. By creating label data in order for the records contained in the database file and passing the label data to the label printer 3, the print application 22 can create multiple labels with multiple text data printed on them.

This specification describes the procedure for creating panel labels using the database printing. A panel label is a label to be attached to a board-like material called a patch panel or patch board. The patch panel is a panel with multiple connectors arranged in an orderly fashion. Each connector of the patch panel is connected to other connectors through the back of the patch panel. For example, devices can be connected to each other by inserting plugs of cables to be connected to the devices into predetermined connectors. The panel labels are labels that are attached near the connectors to distinguish the multiple connectors provided in the patch panel.

The panel labels are also used as labels for faceplates. A faceplate is a plate that covers the perimeter of an opening for a socket or a switch to pass through and is provided with one or more openings. In the faceplate with multiple openings, the opening are often arranged in an orderly fashion.

Figure 2:
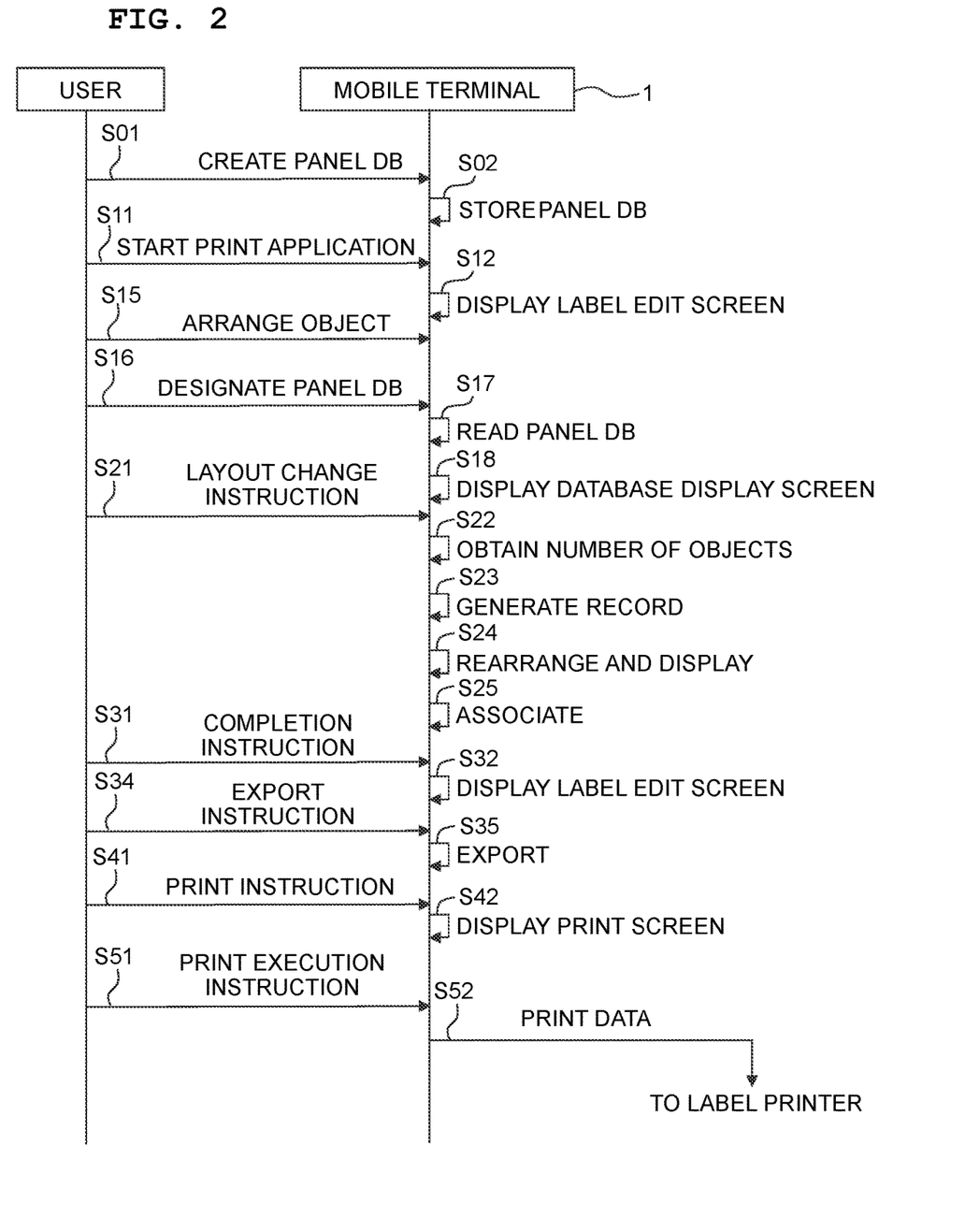
FIG. 2 is a sequence diagram of a label creation procedure.
Figure 3:
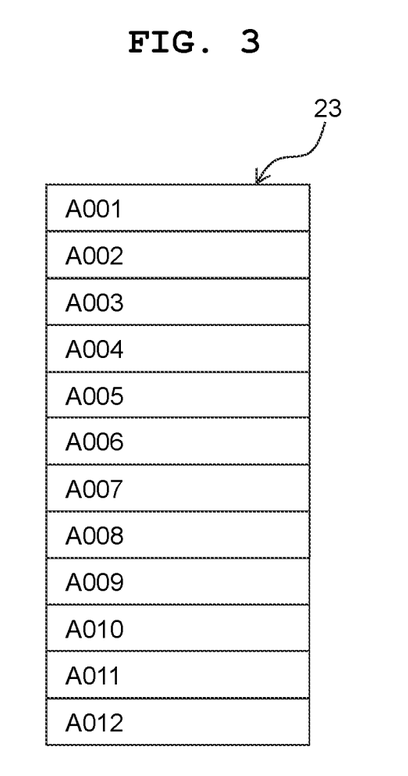
FIG. 3 depicts an example of a panel DB.

As depicted in FIG. 2, a user who wishes to create a panel label creates a panel DB 23 which is a database for storing data to be printed (S01), and stores the panel DB 23 in the mobile terminal 1 (S02). The panel DB 23 is, for example, a database of panel data, which are character strings to be printed on panel labels, separated by commas or line breaks, as depicted in FIG. 3. The user creating the panel label determines the character strings depicting individual connectors and openings, and creates the panel DB 23 for storing each string as panel data.

The panel DB 23 is, for example, a CSV file. The user may create the panel DB 23 using an application program for creating tables or the like, or may create the panel DB 23 as a text file with text depicting panel data. The print application 22 may support database files in formats other than CSV files. The user may create the panel DB 23 in the mobile terminal 1, or the panel DB 23 may be created by another apparatus and stored in the mobile terminal 1.

The panel DB 23 in FIG. 3 is a database in which panel data is arranged in a column. Since the print application 22 of this embodiment can execute database printing, the print application 22 is possible, for example, based on the panel DB 23, to have the label printer 3 create multiple labels with individual panel data printed on each labels. However, when individual labels printed with individual panel data are created, each label must be attached to the position of each individual socket, which is time-consuming to attach and may cause attachment errors. The print application 22 in this embodiment can accept instructions to process the panel DB 23 according to the configure of the panel. Details of the processing are described below.

Figure 4:
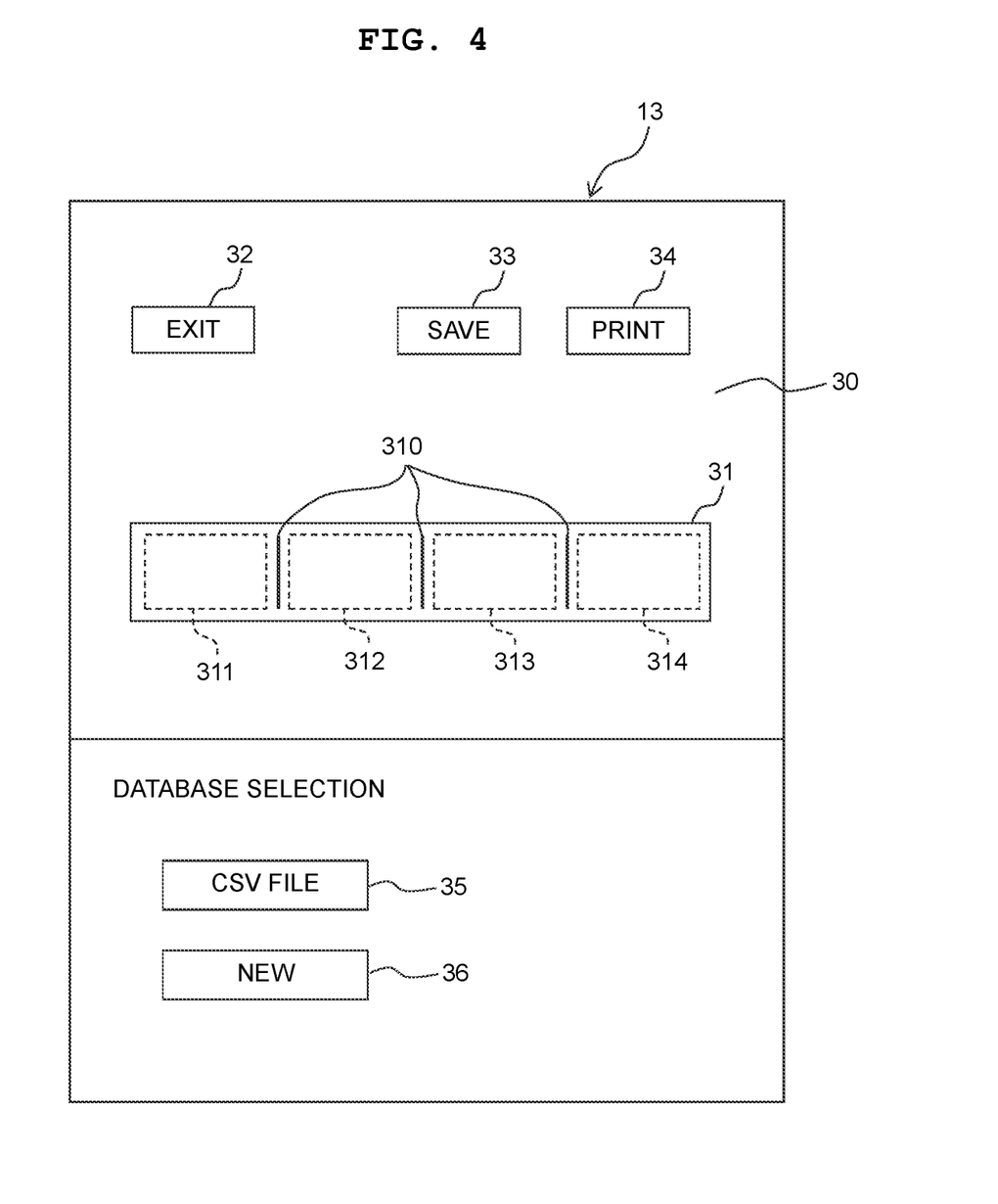
FIG. 4 depicts an example of a label edit screen.

After creating the panel DB 23, the user inputs instructions to start the print application 22 on the mobile terminal 1 (S11). The print application 22, having been started, displays a label edit screen 30 on the user IF 13 that accepts label create instructions, as depicted in FIG. 4, for example (S12). The mobile terminal 1 can then accept user operations on the label edit screen 30 being displayed.

The label edit screen 30 includes, for example, a label area 31 and buttons that accept various instructions, as depicted in FIG. 4. The label area 31 is an area for displaying a print image of a label to be printed. An exit button 32 is provided to accept instructions to exit the print application 22. A save button 33 is provided to accept instructions to save the label data of the label to be printed that is displayed in the label area 31. A print button 34 is provided to accept instructions to execute printing.

The user generates label data for the panel label to be printed on the label edit screen 30. In order to generate the label data, the user arranges objects in the label area 31 in the label edit screen 30 to configure the label to be created (S15). The label area 31 is an example of a work area, and S15 is an example of an arranging process.

The print application 22 has several types of objects that can be arranged in the label area 31, including text, marks, and pictures. The user who wishes to create a panel label arranges objects for the panel label in the label area 31. The object for the panel label is a text object into which text data is written. The user determines the number of panel data to be printed on one label and arranges the determined number of objects in the label area 31.

In patch panels and other panels, the arrangement of each connector varies. There are panels in which all connectors are arranged evenly in a row, panels in which multiple rows of connectors are arranged in multiple columns, panels in which multiple groups of connectors are arranged in multiple groups at intervals, and so on. The user determines the number of panel data to be printed on a one label according to the arrangement of connectors on the panel to which the label is attached, taking into consideration ease of attachment and visibility after attachment.

For example, when creating a panel label to be attached to a patch panel in which four connectors are arranged together, it is easier to create a panel label in which four panel data is printed on a single label. In this case, the user arranges four objects 311-314 for the panel label in one label area 31, as depicted in FIG. 4, for example. If there is existing label data for the panel label, the user can read and use that label data instead of arranging new objects for the panel label in the label area 31.

The print application 22 automatically sets the label lengthwise size of each object to match the length of the string to be printed. The print application 22 can also accept an explicit designation of the size of the object. When multiple objects for the panel label are arranged in the label area 31, the printing application 22 may, for example, automatically place vertical lines 310 between the objects as depicted in FIG. 4.

Once the objects for the panel label are arranged in the label area 31, the print application 22 can accept instructions for database printing. As depicted in FIG. 4, the print application 22 displays buttons 35 and 36 that accept the selection of a database to be used for the database printing. The button 35 is a button that accepts instructions to select a database to be printed from CSV files stored in the mobile terminal 1. The button 36 accepts instructions to create a new database. The user may operate the button 36 to create the panel DB 23 instead of S01 and S02.

The user selects the button 35 to designate the previously created panel DB 23 from the list of CSV files displayed (S16). The print application 22 reads the panel DB 23 which is the designated database (S17). S17 is an example of a reading process.

Figure 5:
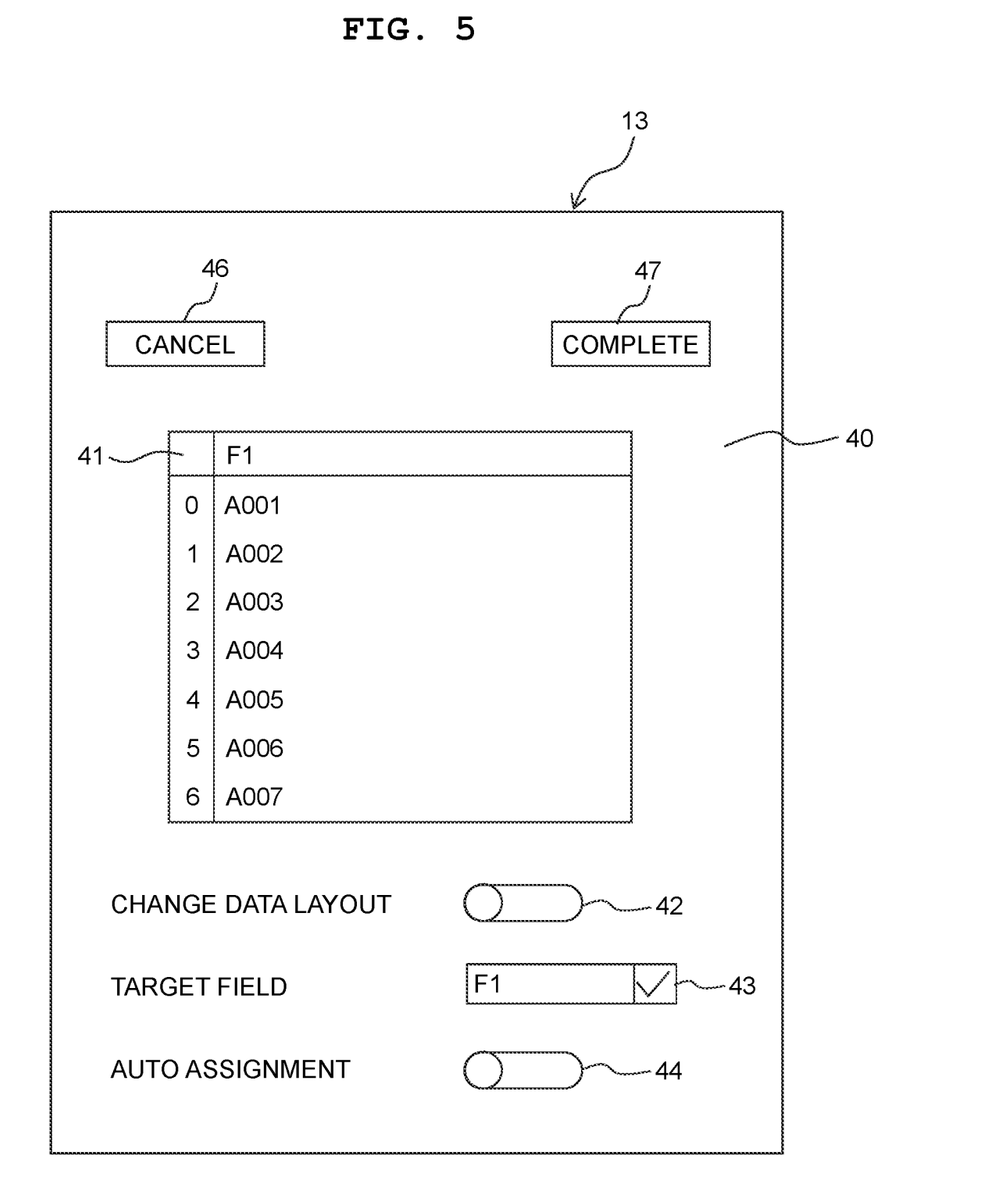
FIG. 5 depicts an example of a database display screen.

The print application 22, for example, displays a database display screen 40 on the user IF 13 that displays each panel data in the read panel DB 23, as depicted in FIG. 5 (S18). FIG. 5 depicts an example of reading the panel DB 23 including the panel data depicted in FIG. 3. The database display screen 40 includes a data display column 41, a layout change button 42, a field designation column 43, an auto assignment button 44, a cancel button 46, and a complete button 47.

In the data display column 41, each panel data (see FIG. 3) included in the read panel DB 23 is displayed within the displayable range. The panel DB 23 in this example includes one row (line) of panel data separated by commas, and all panel data are displayed in the field "F1". The panel data in the panel DB 23 may be a single column of panel data separated by a line break. In this case, the panel data are arranged in multiple fields, each in record "0". Even if the read database includes a single column of panel data, the print application 22 can perform the same process.

The layout change button 42 is provided to accept instructions to change layout of the database being displayed. Upon accepting an operation to the layout change button 42, the print application 22 changes the number of fields in the database and rearranges the panel data. The field designation part 43 is provided to accept the designation of the fields to be changed in the layout by the layout change button 42. The auto assignment button 44 is provided to accept instructions to automatically assign each field in the database to each object arranged in the label data after the layout is changed. The layout change button 42 and the auto assignment button 44 are changeover switches which can be turned on and off by swiping left and right, and both are depicted in the off state in FIG. 5.

The cancel button 46 is provided to accept an instruction to cancel the operation accepted on the database display screen 40 and return to the label edit screen 30. The complete button 47 is provided to accept an instruction to determine that the database currently displayed in the data display part 41 is the database to be printed on the label data, and to complete the generation of the database. When the complete button 47 is operated, the print application 22 stores the database generated by the operation accepted on the database display screen 40 and displays the label edit screen 30.

The user can give an instruction to change the layout of the panel data by swiping the layout change button 42 to the right in the state depicted in FIG. 5 (S21). The print application 22 in this embodiment automatically turns on the auto assignment button 44 when the layout change button 42 is turned on. In this case, the operation to the layout change button 42 is an example of a first operation. The first operation may be a combination of the operation to turn on the layout change button 42 and the operation to turn on the auto assignment button 44.

When the layout change button 42 is turned on, the print application 22 obtains the number of objects arranged in the label area 31 on the label edit screen 30 depicted in FIG. 4 (S22). S22 is an example of an obtaining process. In the example in FIG. 4, the number of objects is 4.

Furthermore, the print application 22 extracts the panel data in the panel DB 23 read in S17, starting from the top, for the number of pieces obtained in S22, and generates a record (S23) that consists of the extracted panel data. S23 is an example of a generating process. Each record generated in S23 is an example of a specific record.

Then, the print application 22 prepares a database containing the number of fields obtained, automatically arranges the records generated in S23, in order, in each record of the database, and lists the records in the data display part 41 (S24). S24 is an example of a listing process.

Figure 6:
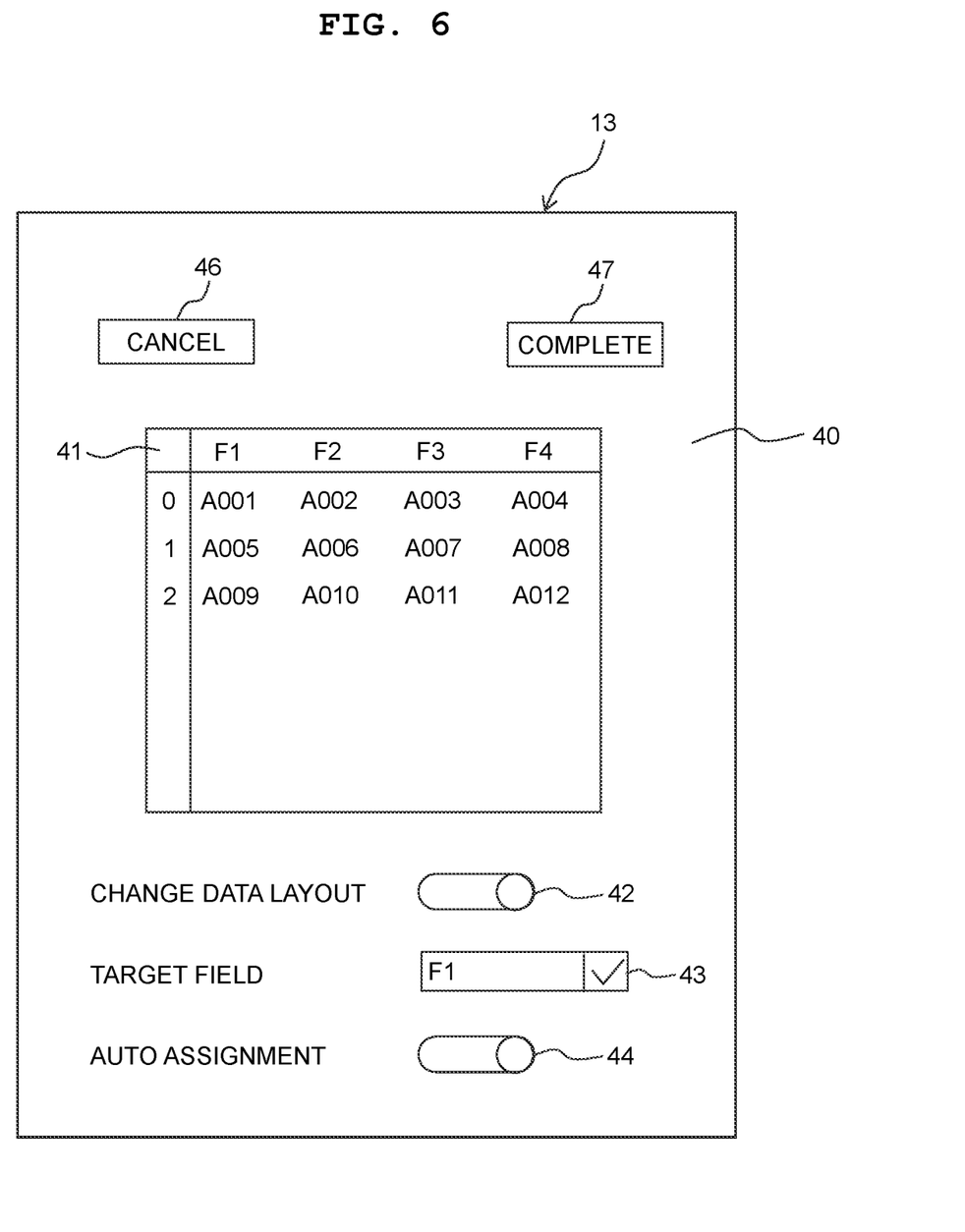
FIG. 6 depicts an example of the database display screen after a layout change.

For example, if the number of pieces is 4, the print application 22 prepares a database with 4 fields F1 to F4, as depicted in FIG. 6, and rearranges all the panel data in order so that the first 4 pieces of panel data read in S17 are placed in each field of the first record "0", the next 4 pieces of panel data are placed in each field of the next record "1", and so on. Since the user first arranges the objects for the panel label in the label area 31, and then the print application 22 rearranges the panel data according to the number of objects for the panel label arranged, it is likely that the labels desired by the user will be created.

If the panel DB 23 containing 12 panel data is rearranged into a database with 4 fields, the print application 22 displays the database rearranged into 3 rows and 4 columns in the data display part 41, as depicted in FIG. 6. If the number of objects is 3 and the panel DB 23 containing 12 panel data is rearranged into a database with 3 fields, the database displayed in the data display part 41 will be a database rearranged into 4 rows and 3 columns. By displaying the database after the rearrangement, the user can confirm whether or not an appropriate database has been generated.

As mentioned above, the print application 22 in this embodiment automatically turns on the auto assignment button 44 when the layout change button 42 depicted in FIG. 6 is turned on. In other words, when the print application 22 receives the instruction in S21, the print application 22 not only creates the rearranged database, but also automatically associates each field in the rearranged database with each object arranged in the label area 31 of the label edit screen 30 (see FIG. 4) (S25). For example, the print application 22 associates the field "F1" with the object 311, the field "F2" with the object 312, and so on. This associates one of the objects with each panel data contained in the generated record. S25 is an example of an auto associating process.

When the print application 22 receives the instruction to change the layout, the print application 22 may execute a process such as making a copy of the panel DB 23 which is being displayed and creating a database with the changed layout using the copy of the panel DB 23. In this case, even if the process is canceled once the layout has been changed, the print application 22 can easily display the original panel DB 23.

When the database creation is completed by rearrangement, the user operates the complete button 47 on the currently displayed database display screen 40 depicted in FIG. 6 (S31). When the complete button 47 is operated, the print application 22 determines the rearranged database, which is the database displayed on the database display screen 40 at that time, as the database to be printed. S31 is an example of a designating process.

Figure 7:
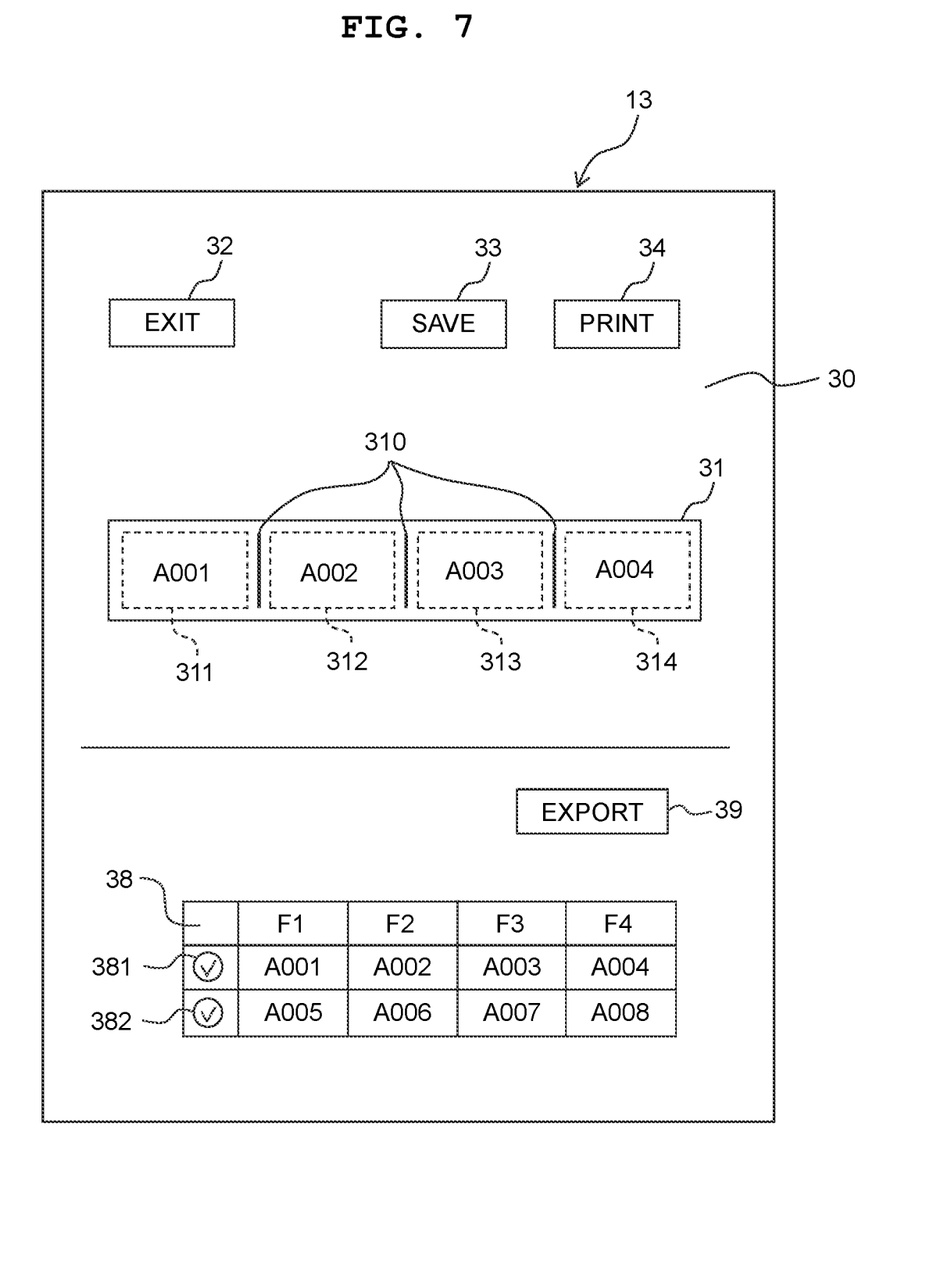
FIG. 7 depicts an example of the label editing screen.

Then, the print application 22 can accept an instruction to execute database printing based on the rearranged database that has been determined as the print target. Furthermore, the print application 22 terminates the display of the database display screen 40 and displays the label edit screen 30 as depicted in FIG. 7 (S32). In the label edit screen 30 depicted in FIG. 7, instead of the respective buttons 35 and 36 for database selection depicted in FIG. 4, a database display part 38 and an export button 39 are displayed. In addition, the label area 31 displays the label data, of the completed rearranged database, in which the four panel data contained in the first record are written to objects 311 to 314, respectively.

The database display part 38 of the label edit screen 30 depicted in FIG. 7 displays the rearranged database within the displayable range, and includes check boxes 381, 382 for selecting whether or not each record is to be printed. In S32, the print application 22 displays all the check boxes 381, 382, etc. in a state where the check boxes are checked for printing. If there is a record not to be printed, the user can indicate that the record is not to be printed by unchecking the check box for the record. The process of accepting the selection of a print target by the check boxes 381, 382, etc. is an example of a selecting process. By selecting label data to be printed, unnecessary printing can be avoided.

The print application 22 can also accept an export instruction by operating the export button 39 on the label edit screen 30 depicted in FIG. 7. Upon accepting the export instruction (S34), the print application 22 generates the rearranged database currently displayed in the database display part 38 into a database file, and exports the database file to the specified export destination (S35). S35 is an example of an exporting process. By exporting the rearranged database, the database can be used on other terminals.

Although the example in which the panel DB 23 containing one column or one row of panel data is read has been described, the print application 22 can also process a database containing multiple fields and multiple records. In that case, multiple fields and multiple records are displayed in the data display part 41 of the database display screen 40 depicted in FIG. 5, and the print application 22 can accept a selection of the fields to be arranged in the field designation part 43. When the print application 22 accepts the selection of fields in the field designation part 43 and the instruction to change the layout, the print application 22 extracts the panel data contained in the designated field from the original database in the number of pieces obtained in S22, and creates a database rearranged to match the arrangement of the objects.

The print application 22 can also accept an instruction to manually change the auto assignment button 44, which was automatically turned on when the layout change instruction was accepted, to off. When the auto assignment button 44 is changed to off, the print application 22 can accept manual assignment of the rearranged database and the objects 311 to 314 arranged in the label area 31 of the label edit screen 30. If the operation to the complete button 47 is accepted in this state, the print application 22 may display the label edit screen 30 with no panel data written in the label area 31 at S32.

In other words, the print application 22 sets whether or not the association is automatically performed based on the operation to the auto assignment button 44. S21, which includes the operation to turn off the auto assignment button 44, is an example of a setting process. S25, when the auto assignment button 44 is turned off and the panel data of each record is associated with each object based on the database changed by the user operation, is an example of a manual associating process. By allowing manual association, the degree of freedom of association is increased and the convenience of database printing is further enhanced.

Figure 8:
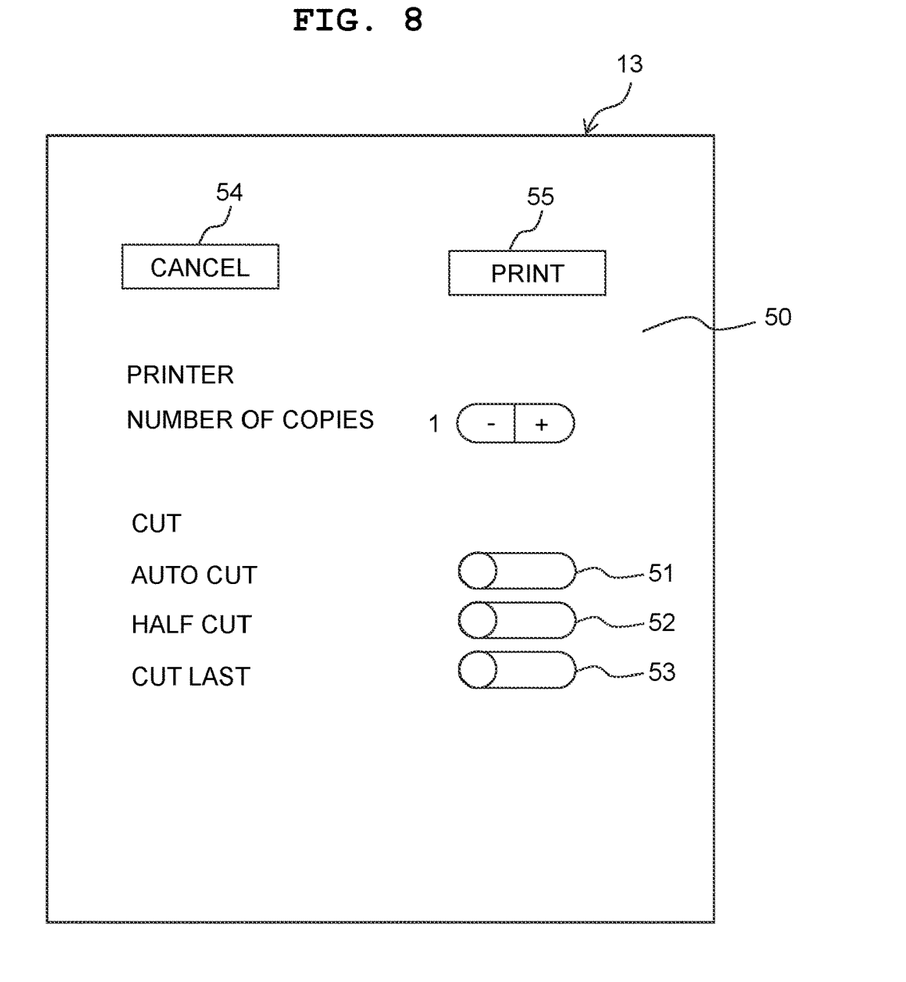
FIG. 8 depicts an example of a print screen.

With the label edit screen 30 displayed, the user can instruct printing by operating the print button 34. When the print button 34 is operated (S41), the print application 22 displays the print screen 50 as depicted in FIG. 8 on the user IF 13 (S42). The print screen 50 accepts the selection of a printer to execute printing and the number of copies to print.

The print screen 50 depicted in FIG. 8 includes, for example, cut instruction buttons 51 to 53 to accept cut selections, a cancel button 54, and a print button 55. The cut instruction button 51 is a button that accepts a cut instruction to cut both the label paper and the release paper for each label. The cut instruction button 52 accepts, for each label, a cut instruction to cut the label paper but not the release paper. The cut instruction button 53 accepts a cut instruction to cut only the back end of the last printed label, without cutting between labels.

When the print application 22 accepts an operation to one of the cut instruction buttons 51 to 53, the print application 22 adds cut information indicating cutting to each label data. When the label printer 3 receives label data to which the cutting information is added, after printing based on the label data, the label printer 3 performs a cutting process based on the cutting information.

When the print button 55 is operated on the print screen 50 (S51), the print application 22 causes the label printer 3 to perform database printing based on the database to be printed (S52). S52 is an example of a printing process. For example, if the database to be printed is a rearranged database, the print application 22 generates label data by writing each panel data to the associated object for each record in the database displayed in the database display part 38 of the label edit screen 30, and then sends the label data to the label printer 3. In this case, S52 is an example of a specific printing process. As a result, printing based on the label data is executed by the label printer 3 and a panel label is created.

The procedure described so far is that the user arranges the required number of objects for the panel label in the label area 31 on the label edit screen 30 (see FIG. 4) (S15), and then the print application 22 accepts the designation of the database (S16) and the instruction to rearrange the database (S21). The print application 22 may be capable of accepting the designation of a database without arranging the objects and accepting instructions for rearrangement of the database.

Figure 9:
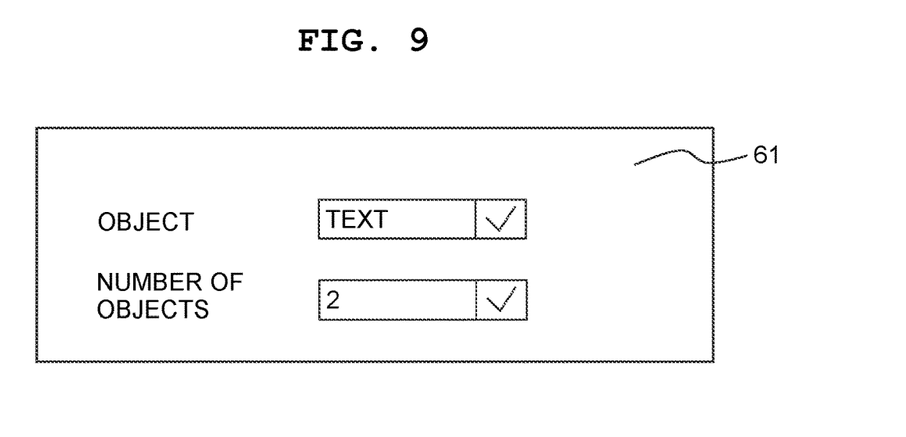
FIG. 9 depicts an example of a screen for selecting the number of objects.

The print application 22 may, for example, accept a database designation with no objects arranged in the label area 31. In that case, for example, as depicted in FIG. 9, the print application 22 may display an input screen 61 to accept input of the type of object and the number of objects, and may accept selection by the user. The print application 22 may determine the type and number of objects to be arranged based on the selection by the user accepted on the input screen 61 and automatically arrange them in the label area 31. The process of arranging the number of objects inputted on the input screen 61 in the label area 31 is an example of an auto arranging process.

Figure 10A:
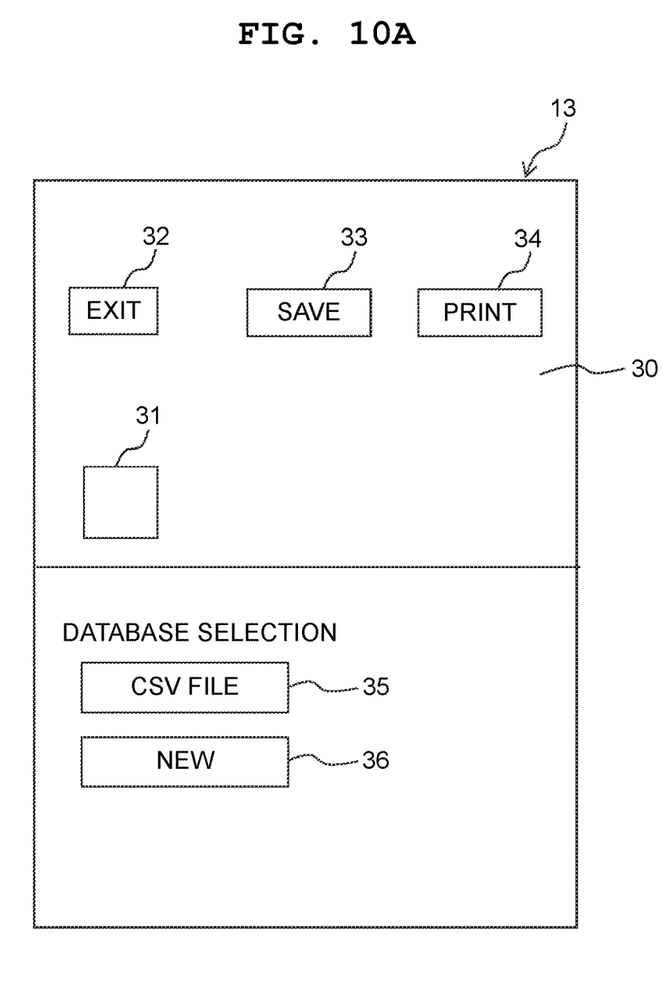
FIGS. 10A and 10B depict examples of the label edit screen and the database display screen.
Figure 10B:
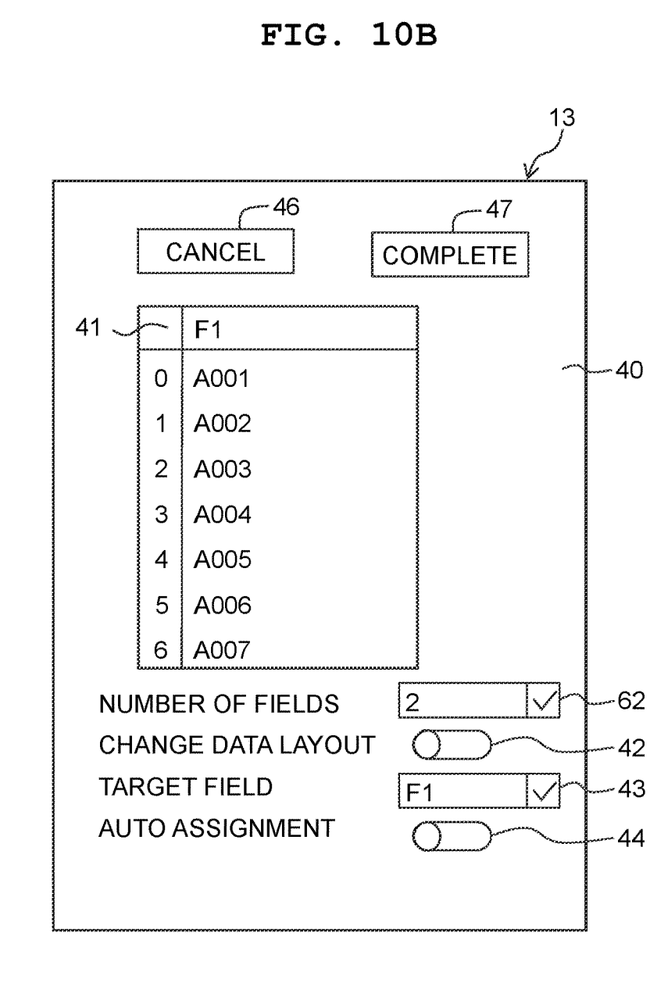

Alternatively, as depicted in FIGS. 10A and 10B, when the print application 22 accepts the database designation when no objects are arranged in the label area 31 (FIG. 10A), a database display screen 40 (FIG. 10B), which includes a number selection part 62 to accept the selection of the number of fields to be rearranged, may be displayed. If the number "4" is selected on this database display screen 40 and an operation to the layout change button 42 is accepted, the print application 22 may change the layout of the database, as depicted in FIG. 6.

As explained in detail above, when the print application 22 in this embodiment accepts the operation to the layout change button 42, the print application 22 generates a record that groups together multiple panel data arranged in one column or in one row by the number of objects arranged in the label area 31, and associates each panel data in the record with each object. The print application 22 is then configured to cause the label printer to print based on the label data in which each panel data is written to each associated object for each record. This increases the convenience of database printing, because even when multiple panel data with no record delimitations are read, labels are output with the panel data delimited to the number desired by the user.

Furthermore, the print application 22 of this embodiment can, for example, use database printing to print labels for patch panels, which are labels with port numbers arranged in a horizontal row and which are attached to the patch panels. When generating labels with a predetermined number of panel data arranged in a row such as this label for a patch panel, the print application 22 of this embodiment can be used to create the label desired by the user based on a database file with no record delimiters.

The present embodiment is merely illustrative and does not limit the present teaching in any way. Therefore, the present teaching can naturally be improved and transformed in various ways within the scope of not departing from the gist of the teaching. For example, the print media of the label printer is not limited to the rolled paper, but can also be a fanfold paper or a cut-sheet label paper.

The form of each display screen illustrated in the accompanying drawings is not limited to the example depicted in the drawings, but can be changed as necessary. For example, the placement and shape of each button is not limited to the examples depicted in the drawings. For example, in the embodiment, an example of label data to print only one line of text is described, but it may be possible to print multiple lines of text in the width direction of the label. In addition, panel labels may include text and shapes other than panel data.

In the embodiment, when the multiple objects for panel labels are arranged in the label area 31, a vertical line 310 is arranged between the objects. However, the print application 22 may not arrange the vertical line 310, may surround each object with a frame line, may separate the objects with shapes other than vertical line, or may accept user selection.

In the embodiment, when the layout change button 42 is turned on, the auto assignment button 44 is automatically turned on. However, for example, the operation to turn on the layout change button 42 and the operation to turn on the auto assignment button 44 may be accepted as separate operations. The print application 22 may also accept a setting for whether or not these buttons are automatically linked.

In the embodiment, the selection of records to be printed out of the database currently displayed in the data display part 41 is accepted, but it is not necessary to accept the selection. Even if this is the case, only the records to be printed can be printed, for example, by generating a database that does not contain any records not to be printed.

In addition, the database does not have to be exportable. Specifically, the export button 39 on the label edit screen 30 may be eliminated.

In the flowchart disclosed in the embodiment, multiple processes in any number of steps can be arbitrarily changed in the order of execution or executed in parallel to the extent that there is no conflict in the content of the process.

The processes disclosed in the embodiment may be executed by a single CPU, multiple CPUs, hardware such as an ASIC, or a combination thereof. The processes disclosed in the embodiment may also be realized in various forms, such as a recording medium storing a program for executing the process, or a method.

What is claimed is:

1. A non-transitory medium storing a program executable by a computer of an information processing apparatus, the program, when executed by the computer, causing the computer to:
   execute a reading process for reading a plurality of pieces of text data arranged in one column or in one row; and
   be ready to accept a first operation by a user in a state that the plurality of pieces of text data has been read,
   wherein in a case that the computer accepts the first operation, the program causes the computer to execute:
      an obtaining process for obtaining a number of pieces of text objects to be included in specific label data;
      a generating process for extracting text data, from the plurality of pieces of text data read in the reading process, by the number of pieces obtained in the obtaining process, and for generating specific records each consisting of the number of pieces of text data; and
      an auto associating process for associating each of the number of pieces of text data included in each of the specific records with one of the text objects included in the specific label data, and
   wherein the program further causes the computer to execute a specific printing process for executing printing by controlling a label printer, for each of the specific records generated in the generating process, based on the specific label data having the text objects in which the number of pieces of text data associated therewith are written respectively.

2. The medium according to claim 1, wherein
   the program causes the computer to execute an arranging process for arranging the text objects to be included in the specific label data in a work area,
   in the obtaining process, the program causes the computer to obtain the number of pieces of text objects arranged in the work area after executing the arranging process, and
   in the auto associating process, the program causes the computer to associate each of the number of pieces of text data included in each of the specific records with one of the text objects arranged in the work area.

3. The medium according to claim 2, wherein
   the program causes the computer to execute a setting process for setting whether to automatically associate each of the number of pieces of text data included in each of the specific records with one of the text objects arranged in the work area,
   in a case of setting to automatically associate each of the number of pieces of text data included in each of the specific records with one of the text objects arranged in the work area in the setting process, the program causes the computer to execute the auto associating process after executing the generating process,
   in a case of setting not to automatically associate each of the number of pieces of text data included in each of the specific records with one of the text objects arranged in the work area in the setting process, the program causes the computer to execute a manual associating process after executing the generating process without executing the auto associating process, and
   in the manual associating process, the program causes the computer to:
      accept a selection of one of the text objects arranged in the work area for each of the number of pieces of text data included in each of the specific records; and
      associate each of the number of pieces of text data included in each of the specific records with the one of the text objects selected.

4. The medium according to claim 2, wherein in the auto associating process, the program causes the computer to associate each of the number of pieces of text data included in each of the specific records with one of the text objects arranged in the work area in an order in which the text objects are arranged in the work area.

5. The medium according to claim 1, wherein
   in the obtaining process, the program causes the computer to accept an input of the number of pieces of text objects and obtain the number of pieces of text objects, and
   after executing the obtaining process and before executing the auto associating process, the program causes the computer to execute an auto arranging process for arranging the text objects in the number of pieces of text objects obtained in the obtaining process, in the work area.

6. The medium according to claim 1, wherein after executing the generating process and before executing the specific printing process, the program causes the computer to execute a listing process for listing the specific records generated in the generating process in a user interface of the information processing apparatus.

7. The medium according to claim 6, wherein
   in a state that the specific records generated in the generating process are listed in the user interface of the information processing apparatus, the program causes the computer to execute a selecting process to accept a selection of the specific records to be printed from the specific records generated in the generating process, and
   in the specific printing process, the program causes the computer to execute printing by controlling the label printer, for each of the specific records selected in the selecting process, based on the specific label data having the text objects in which the number of pieces of text data associated therewith are written respectively.

8. The medium according to claim 1, wherein the program causes the computer to execute an exporting process for exporting a new database file in which the specific records generated in the generating process are registered.

9. The medium according to claim 1, wherein
   the program causes the computer to execute:
      a designating process for designating a database file in which a plurality of fields are defined and in which records each storing a plurality of pieces of text data corresponding to the fields respectively are registered;
      an associating process for associating one text object with each of the fields defined in the database file designated in the designating process; and
      a printing process for:
         generating label data having each of the text objects, associated with the fields, in which the text data corresponding to one of the fields is written, for each of the records registered in the database file; and
         executing printing based on the generated label data by controlling the label printer.

10. An information processing apparatus, comprising:
    a user interface; and
    a computer, wherein the computer is configured to:
- execute a reading process for reading a plurality of pieces of text data arranged in one column or in one row; and
- be ready to accept a first operation by a user in a state that the plurality of pieces of text data has been read, wherein in a case that the computer accepts the first operation via the user interface, the computer is configured to execute:
- an obtaining process for obtaining a number of pieces of text objects to be included in specific label data;
- a generating process for extracting text data, from the plurality of pieces of text data read in the reading process, by the number of pieces obtained in the obtaining process, and for generating specific records each consisting of the number of pieces of text data; and
- an auto associating process for associating each of the number of pieces of text data included in each of the specific records with one of the text objects included in the specific label data, and wherein the computer is configured to execute a specific printing process for executing printing by controlling a label printer, for each of the specific records generated in the generating process, based on the specific label data having the text objects in which the number of pieces of text data associated therewith are written respectively.

* * * * *